March 10, 1942.　　　P. S. BALDWIN　　　2,276,009
HYDRAULIC BRAKE MASTER CYLINDER
Filed May 20, 1937
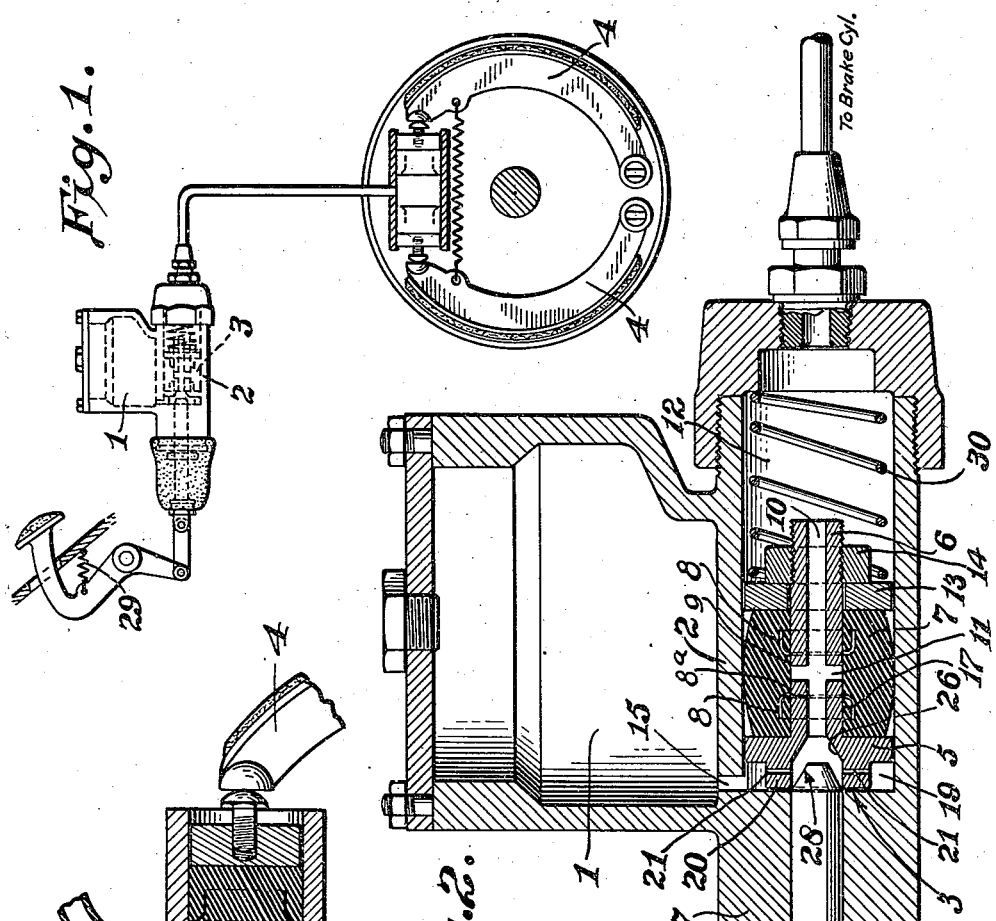
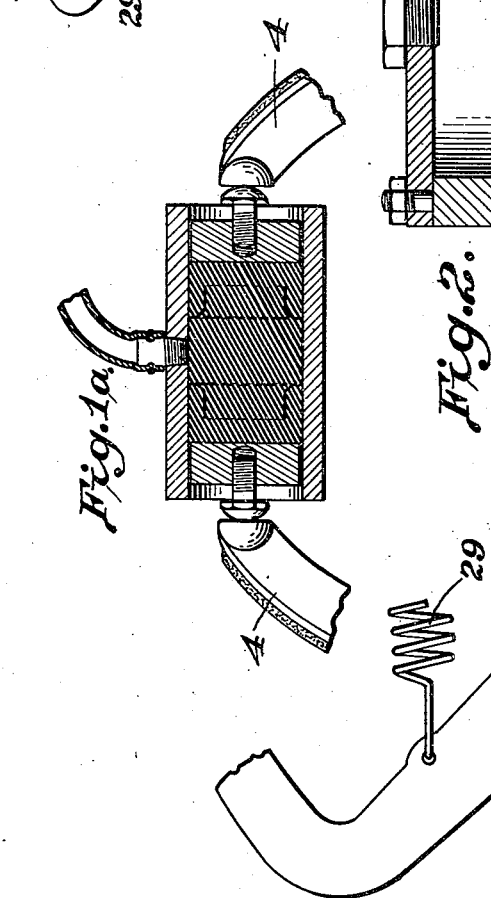
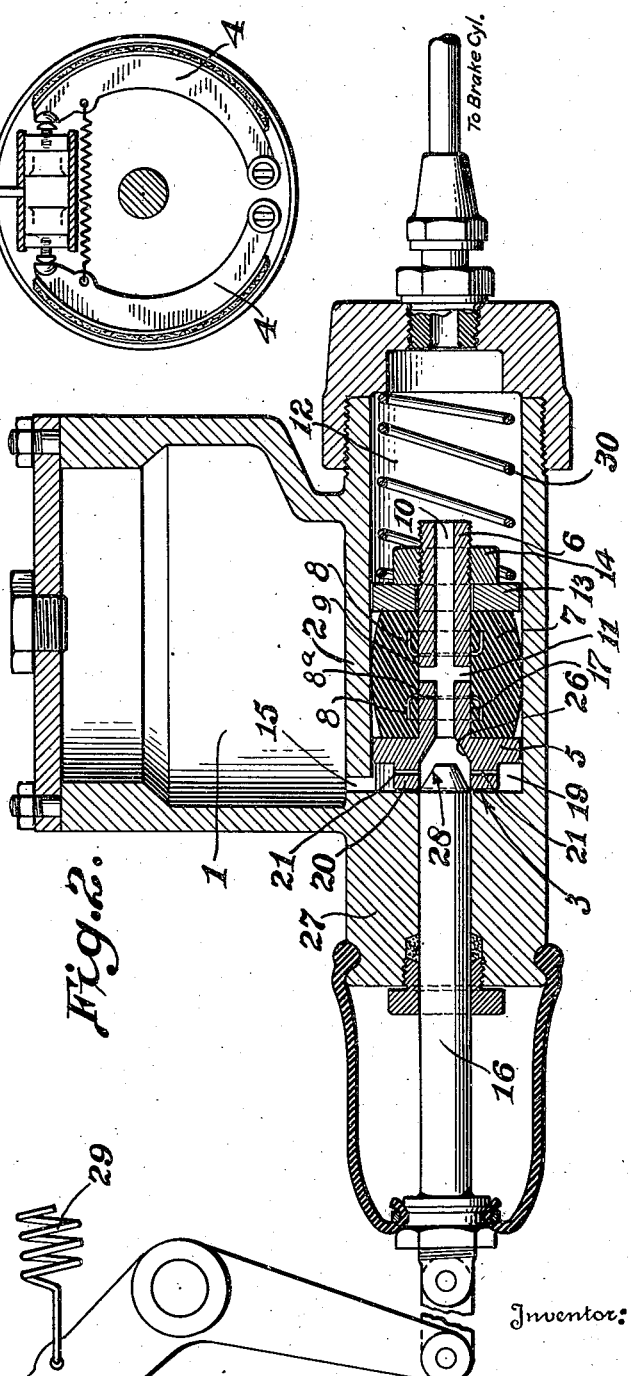
Inventor:
Philip Sidney Baldwin,
By
Attorney.

Patented Mar. 10, 1942

2,276,009

UNITED STATES PATENT OFFICE 2,276,009

HYDRAULIC BRAKE MASTER CYLINDER

Philip Sidney Baldwin, Florence, Italy

Application May 20, 1937, Serial No. 143,805

6 Claims. (Cl. 309—31)

This invention relates to improvements in hydraulic brake systems and more particularly relates to improvements in the piston element of the master cylinder.

Heretofore, these pistons have been constructed of metal, presenting rigid, inflexible surfaces which required packing to prevent the escape of fluid in the system. Flexible cups and expansible elastic bags, as of rubber or rubber substitutes, have also been used as sealing means in these systems. When such is the case, the elastic material is required to resist wear in its frictional contact with metal parts. These elastic materials are prone to swell and even deteriorate in the presence of certain fluids as, for example, mineral oils. Thus, when such fluids are used in conjunction with the conventional flexible sealing cups, these cups have been known to swell to such an extent as to obstruct by-passes in the system and thereby upset the pressure equilibrium thereof and cause the locking of the brakes.

Another objection to the present system is that it has been necessary to develop special fluids for use in these systems to minimize the ill effects thereof on the packings or on the rubber bags or cups. Ordinary, comparatively inexpensive mineral oils could not be used and this has resulted in increased costs for production and upkeep.

Also, it has been found that where flexible sealing cups have been used in hydraulic systems, these are very prone to permit air being sucked into the system, creating a highly objectionable condition.

It is an object of the present invention to overcome all of these objectionable features and to provide a device of this kind which is extremely simple in structure and in operation.

Another object is to provide a piston for a system of this kind which will form a fluid seal in and of itself, without the necessity for additional packing.

Another object is to provide a piston of rubber or similar material which may be used with any type of mineral oil or other hydraulic brake fluid without being subject to deterioration under its influence.

Another object is to provide a piston of this character which is initially mechanically compressible to prevent swelling of the resilient body of the piston through absorption of fluid and, at the same time, to secure any desired initial clearance between the outer resilient surface of the piston and the cylinder bore.

Still a further object is to provide a piston of this character in which the piston is expanded to form a fluid seal in the pressure cylinder on the protractile stroke of the piston, and which is permitted to contract on the retractile stroke thereof.

In systems where the rigid, metallic piston is used, the cost of manufacture is increased by the fact that it is necessary to machine these pistons to close clearances in the cylinder in order to obtain an effective seal even where packing of one kind or another is used. By using the piston of this invention, this necessity is eliminated because these elements may be manufactured very inexpensively and may be adapted for use in the present systems with minor changes therein.

Other objects will appear as the disclosure progresses. For a more complete understanding of this invention, reference is made to the accompanying drawing illustrating several embodiments thereof without in any sense limiting myself thereto.

In the drawing like reference characters refer to like parts throughout the several views.

Figure 1 is a diagrammatical view illustrating a complete hydraulic brake system, including a master cylinder, reservoir and wheel cylinder;

Figure 1a is an enlarged sectional view of the wheel cylinder and expansible elements shown in Figure 1;

Figure 2 is a longitudinal sectional view, with parts in elevation, of a fluid reservoir and master cylinder embodying my invention.

The invention consists of a fluid reservoir 1 supported above a master cylinder 2 in which a member 3 is movable to actuate the brake shoes 4 by means of the fluid column in the system.

As shown in Figure 2, the piston 3 comprises an enlarged head 5 which is of a diameter substantially coextensive with the diameter of the cylinder 2 and has a reduced stem or extension 6 upon which an expansible element or packing 7 is seated. This element is mounted in the manner taught in my prior Patent No. 2,048,771, July 28, 1936. The head 5 is provided with a radially ported boss 20, and a chamber 19 is provided around said boss. Communication between the cylinder and the reservoir is established by means of the port 15. The stem is bored axially throughout its length, and is bevelled inwardly, adjacent its rear end to provide a valve seat 26. The connecting rod 16 slides in a block 27 formed integrally with the cylinder 2, and at its extreme inner end has a bevelled face 28 corresponding with the face of seat 26, and the rod is adapted to be seated there on the forward movement of the brake pedal to which it is suitably linked. The element 7 is made of rubber or other suitable resilient, expansible material and is substantially elliptical in shape with flattened ends when inserted into the cylinder. It has internally formed passages 8, and a bore 9 extending completely therethrough, the passages communicating with the bore as shown at 8a. The element has sealing lips 17, which press against the stem 6 to prevent escape of fluid along the stem. The reduced extension 6 is bored axially as at 10 and radially as at 11 forming a conduit to establish communication between the expansible packing 7 and the compression chamber 12 of the master cylinder. The stem 6 carries a thrust plate 13 which is held in place by a suitable nut 14, threaded on the extremity thereof. The expansible packing 7 may be of a diameter slightly smaller than the bore of the cylinder 2, and is preferably initially compressed axially and expanded radially producing a normal curvature by means of the nut 14 to the desired degree of contact with the cylinder wall this being exaggerated in the drawing. Naturally, when the expansible packing 7 is compressed no matter to what degree, the contact with the wall must obviously initially take place tangentially to the curve produced and the packing 7 tends to be spaced at least partially from the cylinder wall at its forward and rearward ends. The return spring 30 aids to expand the packing radially. As shown in the drawing, the pistons are in retracted position, with the rubber elements contracted, and with the outer surfaces thereof spaced from the cylinder wall except where necessary to maintain the desired degree of contact with the cylinder wall. By this means an initial fluid seal is established to prevent leakage of fluid along the cylinder wall. This initial compression also prevents the packing from absorbing fluid from the system in the same manner as a sponge, for example, cannot absorb water if it is initially compressed in the hand. Likewise, because the packing is under initial axial compression and confined between the head 5 and the plate 13, there is no possibility that the elastic material will swell under the action of the fluid in the system, and it cannot expand, therefore, in an axial direction to close the port 15 while the piston is in its retracted position, as may happen when flexible sealing cups are used with fluids other than those specifically prescribed. When the piston is moved forward, fluid flows through the passages 10 and 11 to the point 8a and into the passages 8, expanding the element and bringing a portion of the outer surface thereof into contact with the cylinder wall. The element, having been partly spaced from the cylinder wall prior to its expansion, has a film of fluid on its surface which lubricates it in its movements in the cylinder and thus reduces wear. My packing is adapted for use with mineral oils as well as with the special hydraulic brake fluids now on the market. The passages 8 are shown as exaggerated in size for the purpose of illustration.

In the operation of the device as shown in Figure 2, pressure on a brake pedal is transmitted by means of a suitable connecting rod 16 to the movable unit 3. The rod 16, on its forward movement, closes ports 21 and thereby establishes a closed fluid pressure circuit in the system. The valve 28 is seated against the seat 26 and the system being filled with fluid, the forward movement of the member 3 causes fluid under pressure to flow through the conduits 10 and 11 along the wall of the bore 9 to the passages 8 of the expansible packing. The fluid under pressure will take effect radially on the body of the packing as taught in my prior patent, flowing into passages 8 causing this body 7 to expand radially so as to form a tight fluid seal both against the cylinder wall and against the external surface of the stem 6, the lips 17 being pressed tightly against the stem. On continued movement of the brake pedal, the pressure exerted in the system will take effect on the brakes to supply the desired action. When the brake pedal is released, the pedal is returned by the action of the spring 29.

As the piston returns communication is reestablished between the cylinder and reservoir. The movable unit 3 is returned more slowly by the action of the spring 30 against the resistance offered by fluid in the chamber 19 and that flowing through the passage 10. By virtue of this construction, it is impossible to create any vacuum in the compression chamber or suction in the system, because fluid is free to flow through the movable member into the system the moment the brake pedal is released. This will be recognized as a distinct improvement in the art. The spring 30 serves to complement the hydraulic pressure in expanding the resilient, expansible packing member on its compression stroke.

Having thus described my invention, I wish it to be understood that the drawing and description are merely for the purpose of illustrating the invention and are not to be construed as limiting me to the construction and arrangements shown. Changes in the construction and arrangement of parts, and substitution of materials may be made without departing from the spirit of the invention as defined by the appended claims.

Where the expression "compression stroke" is used in the specification or claims, it is meant to indicate the working or power stroke of the piston and packing unit.

I claim:

1. In a hydraulic brake system, a cylinder and a piston therein, said piston comprising a resilient packing which is expanded and contracted during the reciprocal movements of the piston in the cylinder, said packing having surfaces adapted to be subjected to axial and radial pressures, means for applying said pressures to said packing, said packing being subjected to both mechanical and hydraulic pressure to form a compression seal during the compression stroke of the piston, said packing being initially compressed axially and expanded radially by mechanical means so that part of the packing is spaced from and part of the packing is in light contact with the cylinder wall in its static condition, and the packing is further expanded radially on the compression stroke into substantial sealing contact with the cylinder wall by radially and axially applied hydraulic pressure, and by an axially applied progressively increasing mechanical pressure, the pressures increasing with the progression of the compression stroke, the pressures supplementing each other.

2. In a hydraulic brake system, a cylinder and a piston therein, said piston comprising a resilient packing which is smaller in diameter than the diameter of the cylinder bore and which is expanded and contracted during the reciprocal movements of the piston in the cylinder, said packing having surfaces adapted to be subjected to axial and radial pressures, means for applying said pressures to said packing, said packing being subjected to both mechanical and hydraulic pressure to form a compression seal during the compression stroke of the piston, said packing being initially compressed axially and expanded radially by mechanical means so that part of the packing is spaced from and part of the packing is in light contact with the cylinder wall in its static condition, and the packing is further expanded radially on the compression stroke into substantial sealing contact with the cylinder wall by radially and axially applied hydraulic pressure, and by an axially applied progressively increasing mechanical pressure, the pressures increasing with the progression of the compression stroke, the pressures supplementing each other.

3. In a hydraulic brake system, the combination of a cylinder, a piston with an expansible packing therefor, said packing having surfaces adapted to be subjected to axial and radial pressures, means for applying mechanical pressure axially and means for applying hydraulic pressure axially and radially to said packing to expand the same; part of the effective sealing surface of the packing being initially spaced from and part initially in light contact with the cylinder wall, the spaced portion being subsequently expanded into substantial sealing contact with said cylinder wall during the compression stroke, the area of contact of said packing with said cylinder increasing progressively with the progression of the compression stroke, the hydraulic pressure supplementing the mechanical pressure to expand the packing on the compression stroke, the packing decreasing its area of contact with the cylinder wall on release of pressure, thereby ensuring lubrication of the packing in its reciprocal movements in the cylinder and reducing wear while ensuring an effective seal on the compression stroke.

4. In a hydraulic brake system, the combination of a cylinder, a piston having an expansible packing, said packing having surfaces adapted to be subjected to axial and radial pressures, means in said cylinder for expanding said packing, part of the effective sealing surface of the packing being initially spaced from and part initially in contact with the cylinder wall, means for applying mechanical pressure axially and means for applying hydraulic pressure axially and radially to said surfaces to expand said spaced portion of the packing into substantial sealing contact with said cylinder wall during the compression stroke, the area of contact of said packing with said cylinder wall increasing progressively with the progression of the compression stroke, the hydraulic pressure supplementing the mechanical pressure to expand the packing, the packing decreasing its area of contact with the cylinder wall on release of pressure, thereby ensuring lubrication of the packing in its reciprocal movements in the cylinder and reducing wear, while ensuring an effective fluid seal on the compression stroke.

5. In a hydraulic brake system, a cylinder and a piston operable therein, said piston having a rigid portion substantially co-extensive with the internal diameter of the cylinder and a reduced portion extending therefrom, an expansible packing having a longitudinal bore extending therethrough and being seated on the reduced portion of said piston, means for expanding said packing, said packing having surfaces adapted to be subjected to axial and radial pressures, a fluid receiving passage in said packing and reduced extension for receiving fluid under pressure, part of said packing being initially spaced from and part initially in light contact with the cylinder wall when the packing is in static condition, means for applying axial and radial hydraulic pressure and means for applying progressively increasing axial mechanical pressure to the packing to expand the same on the compression stroke, the packing decreasing its area of contact with the cylinder wall on release of pressure.

6. In a hydraulic system, a cylinder and a piston therein, said piston comprising a resilient packing which is expanded under relatively high hydraulic pressure during the compression stroke of the piston, and contracted under relatively low hydraulic pressure during the return stroke, said packing having surfaces adapted to be subjected to axial and radial pressures, means for applying the said pressures to said packing, the packing being initially expanded radially to a certain extent by mechanically exerted axial pressure, part of the effective sealing surface of the packing being spaced from and part being in light contact with the cylinder wall in its static condition, the spaced portion of the packing being further expanded into a compression seal during the compression stroke of the piston by radially applied hydraulic pressure and axially applied mechanical and hydraulic pressure, said packing contracting again by its elasticity to its condition in which it is at least partly in contact with and partly spaced from the cylinder wall when hydraulic pressure is reduced to a relatively low value.

PHILIP SIDNEY BALDWIN.